UNITED STATES PATENT OFFICE.

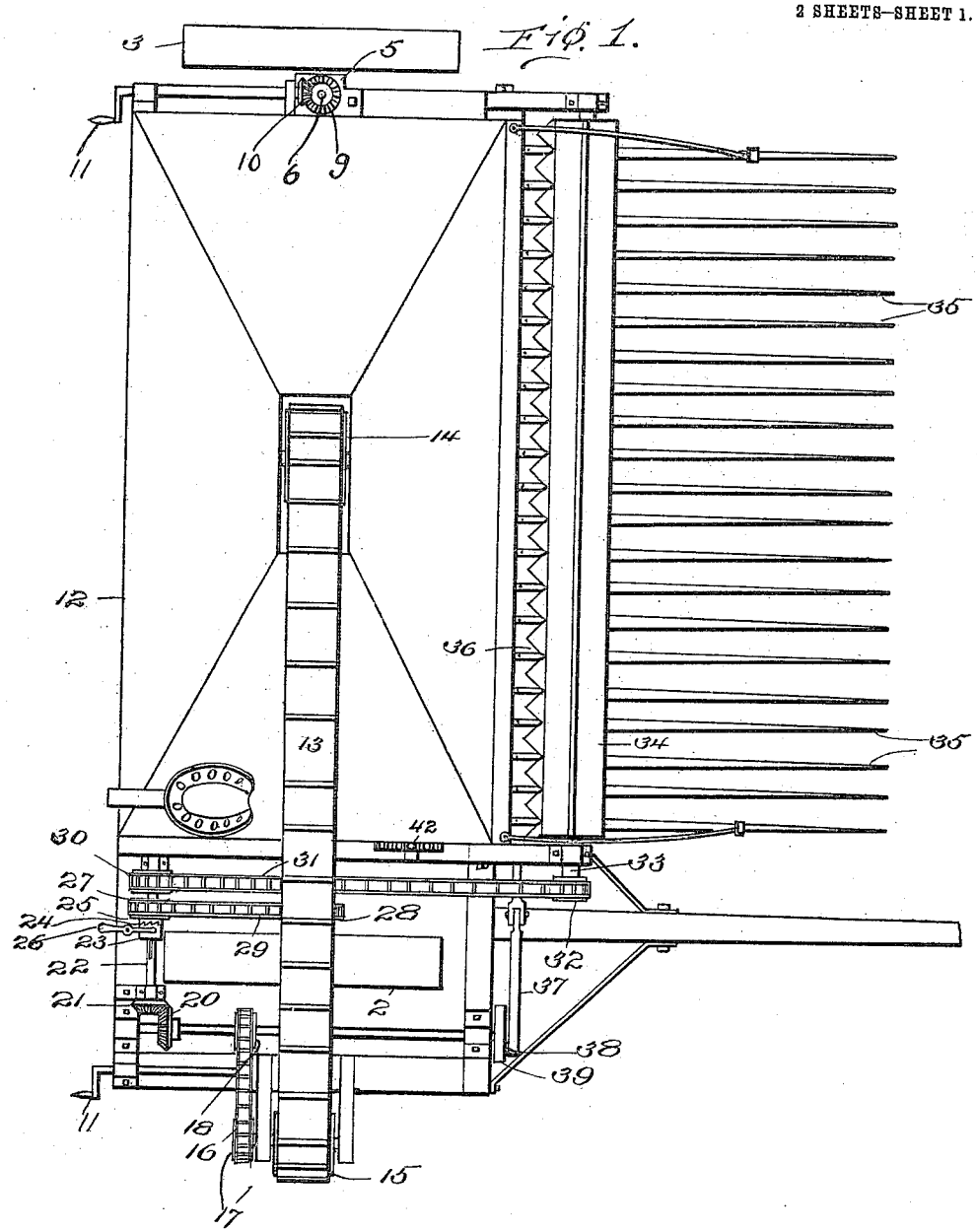

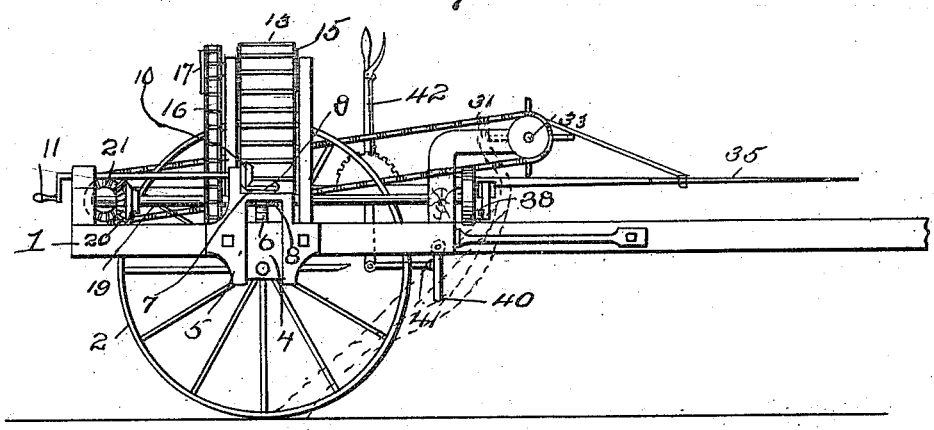
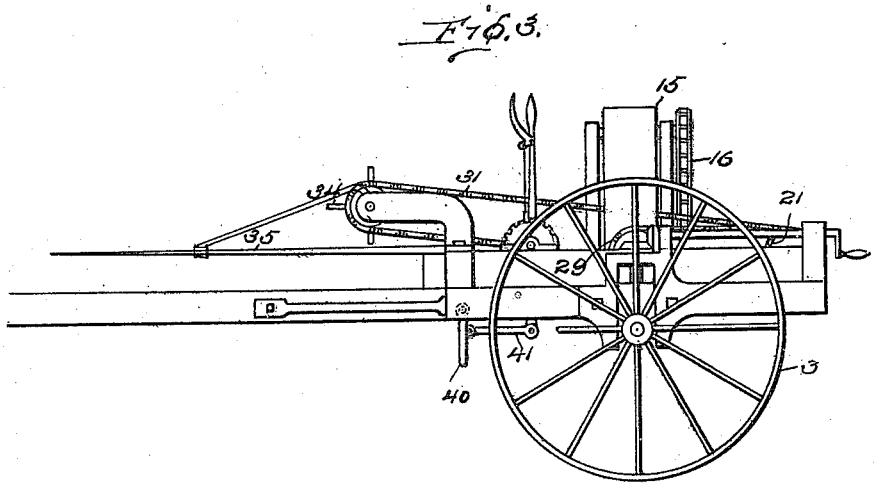

RED P. SMITH, OF DOXEY, OKLAHOMA, ASSIGNOR TO RILEY D. CLARK, OF CARTER, OKLAHOMA.

CORN-HARVESTER.

986,233. Specification of Letters Patent. Patented Mar. 7, 1911.

Application filed April 11, 1910. Serial No. 554,607.

*To all whom it may concern:*

Be it known that I, RED P. SMITH, a citizen of the United States, residing at Doxey, in the county of Beckham and State of Oklahoma, have invented certain new and useful Improvements in Corn-Harvesters, of which the following is a specification.

This invention relates to improvements in harvesters, and particularly to corn harvesters.

The object in view is the arrangement in a corn harvester, of means for pulling the ears of corn from standing stalks of one or more rows.

A further object in view is the arrangement in a corn harvester, of a plurality of resilient fingers adapted to span one or more rows of corn for pulling the ears therefrom, and a reciprocating cutter for severing the ear from the stalk in case any of the ears are not readily removed by the resilient fingers.

A further object of the invention is the arrangement in a corn harvester, of a plurality of resilient fingers for pulling ears of corn from the standing stalks, associated with an adjustable means for bending the stalks to a proper angle for permitting the fingers to act properly on the ears, and a jerking or pulling fan for assisting in removing the ears from the stalk.

A still further object of the invention is the arrangement in a corn harvester, of means for removing ears of corn from standing stalks, and conveying the removed ears to one side of the machine where the ears may be dumped on the ground or in a suitable receptacle provided therefor.

With these and other objects in view the invention comprises certain novel constructions, combinations, and arrangement of parts as will be hereinafter more fully described and claimed.

In the accompanying drawings:—Figure 1 is a top plan view of an embodiment of the invention. Fig. 2 is a side elevation of the structure shown in Fig. 1, looking at the same from the end carrying the power wheel. Fig. 3 is an end view of the structure shown in Fig. 1, looking at the machine in an opposite direction from Fig. 2.

In constructing a machine embodying the invention a suitable framework 1 of any desired kind is provided arranged with suitable cross braces for properly holding the various parts of the operating mechanism correctly in position. The framework 1 is carried by supporting wheels 2 and 3, wheel 2 being the power wheel. Wheel 3 has its axle or journal mounted in a sliding bearing box 4 which is adapted to slide in a bracket 5. Bracket 5 is rigidly secured to framework 1. Framework 1 is adapted to accommodate a screw regulating member 6 which is held in position in bracket 5 by stops 7 and 8 but permitted a free rotary movement. The lower end of regulating member 6 engages the bearing box 4 and the upper end carries a beveled gear 9 which meshes with a beveled gear 10 operated by handle 11. Whenever it is desired to raise or lower the end of framework 1 to which wheel 3 is connected, crank 11 is rotated for moving member 6, which will cause an up and down movement of bearing box 4 according to the direction of rotation. Wheel 2 is provided with a bearing box similar to bearing box 4 which engages a bracket similar to bracket 5, and also surrounding parts similar to the parts surrounding bracket 5, so that the framework may be raised and lowered at either side of the machine.

Arranged between wheels 2 and 3 is a hopper 12 into which the pulled or harvested corn is dumped, and from which it is removed by an elevator 13 which elevates the corn from the bottom of the hopper to one side of the machine, and dumps the same clear of the machine. Elevator 13 is mounted upon suitable pulleys 14 and 15, and is driven by a chain 16 operating on sprocket wheels 17 and 18. Sprocket wheel 17 is mounted upon the axle of pulley 15, while sprocket wheel 18 is mounted upon a shaft 19 extending longitudinally of the machine. Shaft 19 is provided with a beveled gear 20 meshing with a beveled gear 21 carried by a shaft 22. Shaft 22 carries the movable part 23 of clutch 24, which part is adapted to be moved into and out of contact with part 25 by a lever 26. Part 25 of clutch 24 is rigidly secured to a sprocket wheel 27 which is loosely mounted upon shaft 22. Sprocket wheel 27 receives power from power wheel 2 through sprocket wheel 28 and chain 29, so that when part 23 of clutch 24 is in engagement with part 25 power is conveyed to elevator 13 for continuously moving the same as long as wheel 2 is rotated. Shaft 22 not only has rigidly secured thereto beveled gear wheel 21, but also a sprocket wheel 30 which accommodates chain 31. Chain 31 extends forward and passes over a sprocket 32 connected with shaft 33. Shaft 33 extends longitudinally through a corn pulling fan 34 and is mounted in suitable journals at each end thereof. By this arrangement whenever wheel 2 is turning, and clutch 24 is closed, power will be conveyed to pulling fan 34 for causing the same to rotate and assist in removing ears of corn from stalks.

The pulling fan 34 is mounted above and near the inner end of the resilient pulling fingers 35, which are rigidly secured at their inner ends to framework 1. At the inner end of the fingers 35 is arranged a reciprocating blade or cutter 36 which is arranged to cut off the stalk just below the ear when the ear cannot be removed either by the pulling action of fingers 35 or the action of fan 34. Cutter 36 is reciprocated by a suitable pitman 37 pivotally connected with a wrist pin 38 which is mounted upon a crank wheel 39. Crank wheel 39 is rigidly secured to shaft 19, so that power is conveyed to cutter 36 for reciprocating the same whenever clutch 24 is closed, and wheel 2 is rotated. From this it will be observed that all of the movable parts of the machine are thrown into and out of operation by the movement of lever 26.

In order that the corn may be bent for causing the same to present the ears properly to fingers 35, fan 34 and knife 36, an adjustable guiding bar 40, (Fig. 2), is provided, which will cause the upper part of the stalks of corn to take a substantially vertical position just previous to the pulling therefrom of the ears of corn, so that the pull on the ear of corn will be more against the ear than against the stalk. Bar 40 is pivotally mounted upon framework 1, and extends the full length of the cutter 36. A link 41 is pivotally connected therewith, and with a pivotally mounted lever 42 which lever is provided with a pawl and rack for locking the same in any of its adjusted positions, so as to positively hold bar 40 in any position in which it is placed.

What I claim is:

In a corn harvester, a framework, a plurality of comparatively long fingers extending forwardly of said framework for pulling ears of corn from the stalks, a rotatable fan arranged above said fingers and designed to assist the fingers in pulling said ears of corn, a cutter for assisting in removing said ears of corn, a pivotally mounted bar arranged to engage the stalks of corn and press against the same in such a manner as to cause the ears of corn to press downward on said fingers, means for adjusting the position of said bar, a hopper for receiving said ears of corn, a conveyer for transporting said ears from said hopper, and means for regulating the height of said frame.

In testimony whereof I affix my signature in presence of two witnesses.

RED P. SMITH.

Witnesses:
ROBT. T. LANG,
A. L. KITCHIN.